United States Patent Office 3,243,014
Patented Mar. 29, 1966

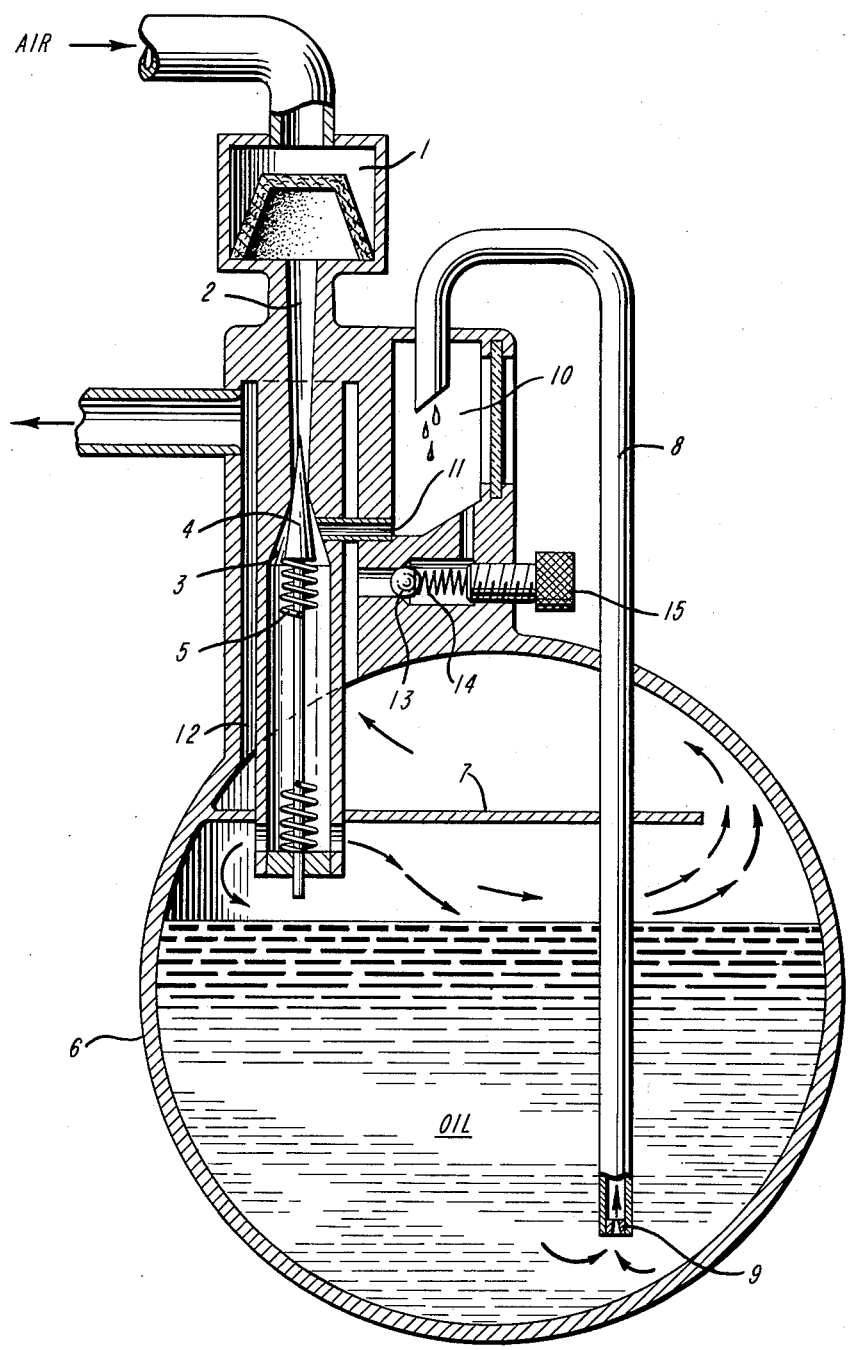

3,243,014
PROCESS FOR MIXING GAS WITH OIL IN DROPLET FORM IN PNEUMATIC INSTALLATIONS FOR THE PURPOSE OF MIST LUBRICATION, AND AN ARRANGEMENT FOR CARRYING OUT THE PROCESS
Gustaf Erik Björklund, Stockholm, Sweden, assignor to Rederi Ab Soya, Hagersten, Sweden, a joint-stock company limited of Sweden
Filed Nov. 27, 1962, Ser. No. 240,377
Claims priority, application Sweden, Dec. 4, 1961, 12,086/61
7 Claims. (Cl. 184—55)

The present invention relates to a process for mixing gas with oil in droplet form in pneumatic installations for the purpose of mist lubrication, gas being caused to pass under pressure through a throttle, for example a venturi pipe, which communicates with an oil chamber in such a manner that the oil is exhausted therefrom and entrained while being finely directed in the flow of gas.

The invention also relates to an arrangement for carrying out the process.

In pneumatic installations where lubrication of parts which are movable in relation to each other is performed by means of oil mist, it often happens that the mist forming system does not function perfectly at low gas speeds. This problem arises particularly in compressed air installations and most particularly in, for example, air driven, high-speed motors for dental purposes where seizing can very easily occur if the lubrication is not satisfactory. The mist lubrication means must function perfectly, independently of the air capacity, if breakdowns are to be avoided.

The invention, the object of which is to effect a perfectly functioning mist lubrication where the above mentioned inconveniences are eliminated, is characterized mainly in that the flow-through area of the throttle is constantly adjusted in such a manner that a suitably adjusted pressure drop is obtained over the throttle for every flow condition, so that the necessary quantity of oil is supplied to the flow of air independently of the air capacity.

The arrangement for carrying out the process is characterized mainly by a flow passage for gas under pressure, which includes a throttle formed for example as a venturi pipe, the flow-through area of which is variable by means of a yielding valve body which under a certain gas pressure completely seals the throttle point and which throttle also communicates with an oil chamber.

The invention will be further explained below with reference to an embodiment diagrammatically illustrated in the enclosed drawing, and in connection with this further characterizing features of the invention will be set forth.

The drawing shows diagrammatically a cross-section through a mist lubrication device for compressed air installations according to the invention.

Incoming air from a pressure source (not shown) passes a filter 1 and flows thereafter into a duct 2 formed with a throttle, in this case a venturi pipe, provided with a seat 3 which is suitably formed to cooperate with a valve body 4 which in a pressureless condition effectively seals it. When the pressure rises above a certain value a spring 5 is compressed wherewith the valve body 4 moves so that the air can flow past this body, through the throttle and into the oil container 6. This oil container is internally provided with shielding members, for example, the one designated by the reference numeral 7. As a result of the pressure, oil is forced up, via the pipe 8 which can be provided with a throttle 9, to the chamber 10 where the oil can freely drop down to the bottom of the chamber. The oil is exhausted, because of the venturi effect in the duct 2, through the duct 11 into duct 2 and by the air at the same time that it is finely divided during the passage down into the oil container 6. In this oil container 6 larger droplets are separated during passage past the shield 7, after which the air continues out through the outlet passage 12 carrying a very finely divided oil mist.

Because the valve body 4 is yieldingly mounted by the spring 5, it yields automatically depending on the pressure drop, whereby a sub-pressure is obtained in the duct 11 substantially independently of the quantity of air. It is thus seen that the effective cross-sectional area of the venturi is varied depending on the amount of air per unit time passing therethrough. In order to obtain further close control of this pressure drop, a reduction valve 13 is inserted between the outlet channel 12 and the chamber 10. The reduction valve 13 is spring-loaded by means of the spring 14 and the pressure which will open the valve is adjusted by means of the set screw 15 and is directly dependent on the pressure drop determined by the reduction valve 13.

The amount of oil per unit of time which is supplied to the outgoing air is in this example mainly constant and largely independent of the amount of air and pressure. The ideal would be for the air to be supplied to an amount of oil per unit of volume which was constant and independent of pressure and the quantity of air. This, however, is difficult to put into practice because when the speed of the air is low the droplets of oil deposit on the wall of the consuming apparatus quicker than when the speed of the air is high. When the speed of the air is low therefore, proportionately more oil must be supplied in order to compensate for the said effect. With the arrangement described, however, the ideal is approached relatively closely if the arrangement can be allowed to operate with a constant pressure drop between the oil container 6 and the chamber 10. Thus the said reduction valve 13 is utilized for maintaining constant pressure drop, wherewith the dimensioning of the venturi pipe and the associated spring-loaded valve body 4 is not so critical. The necessary sub-pressure is, however, very low, with the problems this implies.

Therefore it is suitable to work with a throttle 9 in the pipe 8, whereby the pressure drop can be determined at such a value that adjustment of the elements used in the process is not critical.

The amount of oil can be adjusted in a simple manner to the most diverse demands by using a suitable spring 5 for the valve body 4. The spring can for example have a progressive characteristic. Another possible variation is implied in the shaping of the venturi pipe or the throttle 2 and the form of the valve body 4. The amount of oil can, moreover, be made dependent on oil pressure and the quantity of air in a simple manner by allowing corresponding amounts to actuate the spring 14 of the reduction valve 13 via a suitable arrangement. With the means of assistance described above, any relationship at all in the question of amount-of-oil/quantity-of-air can be established. It is also possible, as shown above to obtain the amount of oil, in the main, independently of the quantity of air per unit of time.

As is evident from the above, the invention offers the possibility of considerable variation despite the simplicity of execution. One of the most important advantages is, as already mentioned, that lubrication is obtained at very low air speeds.

The principal idea of the invention is thus to effect a substantially constant pressure drop, independent of pressure and the quantity of air, between the oil container 6 and the droplet chamber 10 or to make it possible for this pressure drop to be actuated from without.

The invention is not limited to the embodiment shown and described but can be varied in many ways within the scope of the basic idea of the invention.

Having now described the invention, what I claim as new and desire to secure by Letters Patent, is:

1. Air line lubricator comprising a housing with an air inlet, an air outlet, and a venturi section having an upstream and a downstream end, valve means located within said venturi section, spring means to force said valve means into said venturi section in a direction opposite to the direction in which air streams through said venturi section and adapted to close said venturi section when the pressure of the passing air is below a certain limit, a container, said venturi section communicating at its upstream end with said air inlet and at its downstream end with said container, said container in turn communicating with said air outlet, a lubricant chamber provided in said housing, conduit means connecting said container with said lubricant chamber, said chamber communicating with said venturi section, said valve means and said spring means being directly responsive to the amount of air passing said lubricator in such a manner that the effective cross-section of said venturi section is varied depending on the amount of air passing per time unit through said venturi.

2. An air line lubricator as set forth in claim 1, wherein said valve means is a conical body engaging said venturi section with its narrow end and wherein said spring means is a coiled spring, one end of said coiled spring resting against said housing and the other end of said coiled spring engaging the wide end of said conical body.

3. An air line lubricator as set forth in claim 2, having a passageway connecting said lubricant chamber with a point downstream of said venturi section, a check valve interconnected into said passageway and normally blocking said passageway, said check valve adapted to open said passageway when the difference between the higher pressure at said downstream point and the lower pressure in said lubricant chamber exceeds a predetermined pressure differential.

4. An air line lubricator as set forth in claim 3, wherein said check valve is comprised of a seat provided in said passageway, a ball and a second coil spring, said ball normally pressed against said seat by said spring, a bolt threaded into said housing, the bias of said spring being manually adjustable by means of said bolt.

5. An air line lubricator as set forth in claim 4, wherein said conduit means consists of a pipe whose one end is adapted to submerge below the level of the lubricant in said container and whose other end terminates into said lubricant chamber, said one pipe end having an area of restricted cross section.

6. An air line lubricator as set forth in claim 5, wherein a shield is connected to the inner wall of said container, said shield dividing said container into a first and a second chamber, said downstream end of said venturi terminating into said first chamber and said air outlet originating at said second chamber, a passage being provided within said shield and connecting said first with said second chamber, said passage being located at a certain distance from the point where said downstream end of said venturi section terminates into said first chamber and from the point where said air outlet originates at said second chamber, so that air leaving said venturi section enters said air outlet via said first chamber, said passage and said second chamber.

7. A device adapted to atomize liquid within a stream of gas under pressure comprising in combination, a reservoir to contain liquid to be atomized, a valve head surmounting said reservoir and having gas inlet and discharge ports, a gas passage extending into said inlet port, a valve seat within said head communicating with said gas passage and comprising a venturi opening into a gas conduit discharging into the upper portion of said reservoir, a tapered valve member mounted within said venturi for longitudinal movement toward and from said valve seat, spring means engaging said valve member and normally urging the same against said seat to close said valve but said valve being movable from said seat substantially proportionally to the amount of gas delivered per time unit to said gas inlet port for transmission thereof towards the surface of liquid in said reservoir, a liquid chamber in said head, a liquid conduit extending from the lower portion of said reservoir to said chamber and arranged to discharge drops of liquid into said chamber, a channel extending from the lower part of said chamber to said venturi and operable to create negative pressure in said chamber for passage of said liquid through said channel.

References Cited by the Examiner

UNITED STATES PATENTS

| | | | |
|---|---|---|---|
| Re. 24,291 | 3/1957 | Goodyear | 184—55 |
| 2,541,129 | 2/1951 | Taber et al. | 261—78 |
| 2,661,814 | 12/1953 | Nogren et al. | 184—55 |
| 2,718,934 | 9/1955 | Nogren et al. | 184—55 |
| 2,835,267 | 5/1958 | Andresen et al. | 261—78 |
| 2,887,181 | 5/1959 | Dillon | 184—55 |
| 2,889,009 | 6/1959 | Endebak et al. | 261—78 |
| 2,921,649 | 1/1960 | Wilkerson | 261—78 |
| 2,990,848 | 7/1961 | Wilson et al. | 137—205.5 |

FOREIGN PATENTS 417,191   8/1910   France.

LAVERNE D. GEIGER, *Primary Examiner.*

RONALD R. WEAVER, *Examiner.*

D. RIESS, H. BELL, *Assistant Examiners.*